United States Patent Office 2,974,117
Patented Mar. 7, 1961

---

2,974,117

VULCANIZABLE COMPOSITION COMPRISING BUTYL RUBBER, AN ALKALI METAL SILICO-ALUMINATE AND A SULFUR COMPOUND, AND PROCESS FOR VULCANIZING SAME

Walter L. Dunkel, Fanwood, John L. Ernst, Westfield, and James F. Wernersbach, South Plainfield, N.J., assignors to Esso Research and Engineering Company, a corporation of Delaware No Drawing. Filed Jan. 10, 1957, Ser. No. 633,392

10 Claims. (Cl. 260—41.5)

This invention relates to the vulcanization of rubbery polymeric compositions which are copolymers of isoolefins and multiolefins and to the improved vulcanizates formed thereby. More particularly, the present invention relates to the vulcanization of butyl rubber in the substantial absence of added elemental sulfur by means of a combination of a zeolitic material, a bivalent metal oxide such as zinc oxide, and certain sulfur bearing compounds.

Butyl rubber is a copolymer of a major proportion of a $C_4$ to $C_8$ isoolefin and a minor proportion of a $C_4$ to $C_{14}$ multiolefin. These copolymers, which have Staudinger molecular weights between about 20,000 and 200,000, are commonly referred to in literature as butyl rubber or GR–I rubber (Government-Rubber-Isobutylene) and for example, are referred to as "butyl rubber" in the book "Synthetic Rubber" by G. S. Whitby. The expression "butyl rubber" as employed in the specification and claims is intended to include copolymers having Wijs iodine numbers between about 0.5 and 50 containing about 85 to 99.5 weight percent of an isoolefin and about 15 to 0.5 weight percent of a multiolefin which is preferably a $C_4$ to $C_6$ conjugated diolefin. The preparation of butyl rubber, which is preferably the reaction product of isobutylene and isoprene, is amply described in U.S. Patent No. 2,356,128 to Thomas et al.

It has now been discovered that butyl rubber may be vulcanized without elemental sulfur by curing the same in the presence of a combination of a minor proportion of a mixture of a bivalent metal oxide such as zinc oxide, a zeolitic material, and a sulfur bearing compound such as dipentamethylene thiuram tetrasulfide and/or N,N'-dithiomorpholine or the like. The amount of the respective curates is as follows per 100 parts by weight of butyl rubber: about 2 to 30 parts by weight of the bivalent metal oxide such as zinc oxide, about 20 to 80 parts by weight of the zeolitic material, and about 0.3 to 20 and preferably about 0.5 to 15 parts by weight of the sulfur bearing compound such as the dipentamethylene thiuram tetrasulfide and/or N,N'-dithiomorpholine or the like. Vulcanization is generally accomplished by heating the resulting admixture to a temperature of between about 250° and 400° F. and preferably between about 275° to 375° F. for a time between about 5 and 200 minutes, preferably between about 10 and 100 minutes.

For the purposes of the present invention, the zeolitic material is a synthetic zeolite having a pH between about 9 and 12 such as a synthetic, precipitated, hydrated alkali metal (or especially sodium) silico-aluminate having a pH of between about 10.5 and 11.5, a water of hydration content of about 0 to 15%, and preferably between about 3 and 8% and a moisture content of about 0 to 10%, advantageously about 0 to 7% and preferably between about 3 and 5%. Suitable synthetic zeolite materials falling within the above definition include the following or their equivalent:

$(NaAlSi_2O_6)_2(H_2O)$ having about 2 to 7% of water of hydration and a moisture content of about 0 to 6%, $Na_2Al_2Si_3O_{10}(H_2O)$ having about 3 to 7% water of hydration and a moisture content of about 2 to 7%, $NaAlSi_2O_6(H_2O)$ having about 4 to 10% water of hydration and a moisture content of between about 4 and 8%, and especially $(Na_2Al_2Si_3O_{10})_2(H_2O)_3$ having about 3 to 7% water of hydration and a moisture content of between about 0 and 6%.

For use in accordance with the present invention, the sulfur bearing compound is preferably dipentamethylene thiuram tetrasulfide and/or N,N'-dithiomorpholine but may also comprise compounds having the formula:

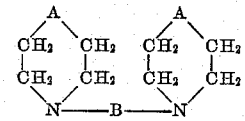

in which A is selected from the group consisting of $CH_2$, O, or S and B is selected from the group consisting of

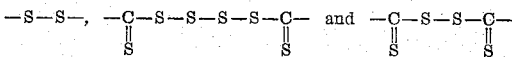

Typical sulfur bearing compounds useful for the purposes of the present invention include dipentamethylene thiuram tetrasulfide; N,N'-dithiomorpholine; N,N'-tetrathiomorpholine; bis(1-morpholinyl thiocarbamyl) disulfide; bis(1-morpholinyl thiocarbamyl) tetrasulfide; N,N'-dithiodipiperidine; N,N'-tetrathiodipiperidine; cyclopentamethylene thiuram tetrasulfide; p-thiazine disulfide; bis(1-p-thiozinyl thiocarbamyl) tetrasulfide, etc.

Although the general range usable for such sulfur bearing compounds is between about 0.3 and 20 parts by weight per 100 parts by weight of butyl rubber as outlined above, it has been found that when using such compounds containing less than about 4 sulfur atoms, the amount of sulfur bearing compound employed is preferably between about 0.5 or 1.0 to 10 parts by weight per 100 parts by weight of butyl rubber. However, if the sulfur bearing compound used contains 4 or more sulfur atoms the amount of such sulfur bearing compound employed is preferably between about 2 or 5 to 15 parts by weight per 100 parts by weight of butyl rubber.

In order to more fully illustrate the present invention, the following experimental data are given:

Example 1

One hundred parts by weight of a commercial butyl rubber (hereinafter referred to as butyl rubber "A") having a Mooney viscosity at 212° F. for 8 minutes of 75, a mole percent unsaturation of 1.6 and a viscosity average molecular weight of 485,000, were compounded on a 2-roll commercial rubber mill at a roll temperature of 100° F. with the following:

| Component: | Parts by weight |
|---|---|
| Butyl rubber "A" | 100 |
| $(Na_2Al_2Si_3O_{10})_2(H_2O)_3$ (i.e. Zeolex–23 having 6–7% water of hydration and a pH of 10.5–11.5) | 50 |
| Zinc oxide | 5.0 |
| Stearic acid | 0.5 |
| Dipentamethylene thiuram tetrasulphide | 2.0 |

Four samples of the above compounded butyl rubber compositions were then cured at 320° F. for various periods of time between 15 and 60 minutes in order to vulcanize the same. The following physical inspections were noted:

| Property | Curing Time in Minutes | | | |
|---|---|---|---|---|
| | 15 | 30 | 45 | 60 |
| Tensile strength, p.s.i. | 1,750 | 1,800 | 1,750 | 1,450 |
| Elongation, Percent | 765 | 765 | 735 | 715 |
| Modulus @ 300% Elongation (p.s.i.) | 400 | 400 | 350 | 325 |
| Shore "A" Hardness | 55 | 55 | 55 | 55 |
| Percent Volume, Swell (in cyclohexane) | 430 | 410 | 420 | 415 |

The above data show that a typical sulphur bearing compound cures butyl rubber in the substantial absence of added elemental sulphur in accordance with the present invention to a high quality vulcanizate. Such a vulcanizate, as in Example 1, has been found to be useful in applications where corrosion due to the presence of elemental sulphur cannot be tolerated.

*Example 2*

One hundred parts by weight of a butyl rubber (hereinafter referred to as butyl rubber "B") having a Mooney viscosity at 212° F. for 8 minutes of 52, a mole percent unsaturation of 2.1 and a viscosity average molecular weight of 325,000, were compounded on a rubber mill at a roll temperature of 100° F. with the following:

| Component: | Parts by weight |
|---|---|
| Butyl rubber "B" | 100 |
| Zeolex-23 | 50 |
| Zinc oxide | 5.0 |
| Stearic acid | 0.5 |
| N,N'-dithiomorpholine | 10.0 |

Two samples of the above compounded butyl rubber compositions were then cured for 45 minutes and 60 minutes respectively at a temperature level of 320° F. in order to vulcanize the same, the following inspections being noted:

| Property | Curing Time in Minutes | |
|---|---|---|
| | 45 | 60 |
| Tensile strength, p.s.i. | 1,350 | 1,400 |
| Elongation, Percent | 700 | 715 |
| Modulus, 300% Elongation (p.s.i.) | 260 | 275 |
| Shore "A" hardness | 50 | 50 |
| Percent volume, swell (in cyclohexane) | 350 | 380 |

The above data show that a typical sulfur bearing compound cures butyl rubber in the substantial absence of added elemental sulfur in accordance with the present invention into a high quality vulcanizate. Butyl rubber, when compounded and cured as above, substituting group II metal zeolites and clays for alkali metal zeolites, does not result in a technically useful vulcanizate.

Resort may be had to various modifications and variations of the disclosed embodiments of the present invention without departing from the spirit of the invention or the scope of the appended claims.

What is claimed is:

1. A non-corrosive, completely vulcanizable composition comprising 100 parts by weight of a rubbery copolymer of about 85 to 99.5 weight percent of a $C_4$ to $C_8$ isoolefin and about 0.5 to 15 weight percent of a $C_4$ to $C_{14}$ multiolefin, about 20 to 80 parts by weight of a synthetic precipitated hydrated alkali metal silico-aluminate having a pH between about 9 and 12, and about 0.5 to 15 parts by weight of a sulfur compound selected from the class consisting of dipentamethylene thiuram tetrasulfide and N,N'-dithiomorpholine, and about 2 to 30 parts by weight of zinc oxide, said composition being free of added elemental sulfur.

2. A composition according to claim 1 in which the silico-aluminate comprises $(Na_2Al_2Si_3O_{10})_2(H_2O)_3$.

3. Composition according to claim 2 in which the sulfur compound is dipentamethylene thiuram tetrasulfide.

4. A composition according to claim 2 in which the sulfur compound is N,N'-dithiomorpholine.

5. A process for producing non-corrosive butyl rubber vulcanizates which comprises compounding about 100 parts by weight of a rubbery copolymer of about 85 to 99.5 weight percent of a $C_4$ to $C_8$ isoolefin and about 0.5 to 15.0 weight percent of a $C_4$ to $C_{14}$ multiolefin with about 20 to 80 parts by weight of a synthetic, precipitated, hydrated alkali metal silico-aluminate having a pH between about 9 and 12, about 0.5 to 15 parts by weight of a sulfur compound selected from the class consisting of dipentamethylene thiuram tetrasulfide and N,N'-dithiomorpholine, and about 2 to 30 parts by weight of zinc oxide, and completely vulcanizing the resulting composition in the absence of added elemental sulfur at a temperature level between about 250° and 400° F. for a time between about 5 and 200 minutes.

6. A process according to claim 5 in which the silico-aluminate has the general formula $$(Na_2Al_2Si_3O_{10})_2(H_2O)_3$$

and has a pH of between about 10.5 and 11.5.

7. A process according to claim 5 in which the sulfur compound is N,N'-dithiomorpholine, the vulcanization being at a temperature level between about 275° and 375° F.

8. A process for producing non-corrosive butyl rubber vulcanizates which comprises compounding, in the substantial absence of added elemental sulfur, about 100 parts by weight of a isobutylene-isoprene rubbery copolymer having a Mooney viscosity (at 212° F. for 8 minutes) of about 52 to 75, a mole percent unsaturation of about 1.6 to 2.1, and a viscosity average molecular weight of about 325,000 to 485,000, having homogeneously admixed therewith about 50 to 80 parts by weight of a zeolite having a composition corresponding approximately to the formula $(Na_2Al_2Si_3O_{10})_2(H_2O)_3$, and having about 6–7% water of hydration and a pH of about 10.5 to 11.5, about 2.0 to 5.0 parts of zinc oxide, and about 2.0 to 10.0 parts of a sulfur compound comprising dipentamethylene thiuram tetrasulfide, and completely vulcanizing the resulting composition in the absence of added elemental sulfur at a temperature of about 275° to 320° F. for about 15 to 60 minutes.

9. A composition according to claim 2 in which the rubbery copolymer is an isobutylene-isoprene copolymer.

10. A process according to claim 5 in which the sulfur compound is dipentamethylene thiuram tetrasulfide, the vulcanization being at a temperature of between about 275° and 375° F.

References Cited in the file of this patent

UNITED STATES PATENTS

| 2,417,093 | Sparks et al. | Mar. 11, 1947 |
| 2,508,262 | Jennings et al. | May 16, 1950 |
| 2,702,286 | Iknayan et al. | Feb. 15, 1955 |